United States Patent
Paul (10) Patent No.: US 8,644,434 B2
(45) Date of Patent: Feb. 4, 2014

(54) APPARATUS AND METHODS FOR PERFORMING SEQUENCE DETECTION

(75) Inventor: Sanjib Paul, West Bengal (IN)

(73) Assignee: LSI Corporation, San Jose, CA (US)

( * ) Notice: Subject to any disclaimer, the term of this patent is extended or adjusted under 35 U.S.C. 154(b) by 382 days.

(21) Appl. No.: 13/240,895

(22) Filed: Sep. 22, 2011

(65) Prior Publication Data

US 2013/0077717 A1   Mar. 28, 2013

(51) Int. Cl.
*H03D 1/00* (2006.01)
*H04L 27/06* (2006.01)

(52) U.S. Cl.
USPC ........... 375/342; 375/340; 375/259; 375/316; 714/715; 714/716; 714/781; 714/746

(58) Field of Classification Search
CPC . H04L 25/067; H04L 1/0045; H04L 27/2647; H04L 1/005; H04L 1/0054; H04L 7/033; H04L 2027/0095; H04L 7/041; H04L 7/042; H04L 25/4904; H04L 43/50; H04L 12/2697; H04L 1/242; H04L 1/243; H04L 1/24; G06F 11/221; G01R 31/31716; G01R 31/31717
USPC .......... 375/340, 342, 259, 316; 714/715, 716, 714/781, 746
See application file for complete search history.

(56) References Cited

U.S. PATENT DOCUMENTS

| | | | |
|---|---|---|---|
| 3,493,929 A | | 2/1970 | Perlman |
| 5,072,448 A | | 12/1991 | Atwell et al. |
| 5,402,429 A | * | 3/1995 | Stessens ........................ 714/781 |
| 5,694,405 A | * | 12/1997 | Kuwahara ..................... 714/752 |
| 5,774,480 A | * | 6/1998 | Willy ............................. 714/776 |
| 6,427,220 B1 | * | 7/2002 | Vityaev ......................... 714/781 |
| 6,819,224 B2 | * | 11/2004 | Brierley ..................... 340/146.2 |
| 7,797,701 B1 | | 9/2010 | Snow |
| 8,281,221 B2 | * | 10/2012 | Sakimura et al. ............. 714/764 |

* cited by examiner

*Primary Examiner* — Phuong Phu
(74) *Attorney, Agent, or Firm* — Otterstedt, Ellenbogen & Kammer, LLP (57) ABSTRACT

An apparatus for performing sequence detection on a stream of incoming bits comprises a memory and circuitry coupled to the memory. The circuitry is operative, for each bit of the stream of incoming bits, to overwrite a first binary number presently stored in the memory with a second binary number, and to provide an output indicative of when the second binary number is equal to a predetermined value. The output indicative of when the second binary number is equal to the predetermined value is, in turn, indicative of when a binary number constructed by the stream of incoming bits is divisible by a prescribed integer.

20 Claims, 6 Drawing Sheets

```
module divide_n(input rst, input b, input clk,output logic op);

parameter N=5;
reg [2:0] state;

always @ (negedge rst or posedge clk) begin
if(~rst) begin
    state = 3'b0;
    op    = 1'b0;
end
else if (({state,b} < N) begin
    state = {state[1:0] ,b} ;
    if(state == 0)
        op = 1'b1;
    else
        op = 1'b0;
end
else if({state,b} >= N) begin
    state = {state,b} - N;
    if(state == 0)
        op = 1'b1;
    else
        op = 1'b0;
end
end
endmodule
```

APPARATUS AND METHODS FOR PERFORMING SEQUENCE DETECTION

FIELD OF THE INVENTION

The present invention relates generally to electrical and electronic devices and circuits, and more particularly relates to apparatus for performing bit sequence detection, and methods therefor.

BACKGROUND OF THE INVENTION

A sequence detector generally comprises circuitry operative to receive an incoming stream of bits and to indicate, almost in real time, when those bits take on a certain predetermined property. Sequence detectors may be utilized, for example, to generate a signal (e.g., a logical high) every time a particular sequence of bits (e.g., 10101) occurs in an incoming bit stream. A particular sequence of bits may be included, for instance, at the beginning and end of a digital message. A sequence detector may be a useful tool in signaling the beginning and end of such a message.

Sequence detectors tend to need greater memory reserves when the number of bits in the sequence being detected is large. Greater memory reserves, in turn, tend to make sequence detection circuitry larger and ultimately more expensive to implement.

SUMMARY OF THE INVENTION

The present invention, in illustrative embodiments thereof, relates to apparatus and methods for use in indicating, almost in real time, when a binary number formed by a stream of incoming bits is divisible by a predetermined integer. Advantageously, each of these embodiments only requires a respective memory having a storage capacity that is substantially smaller than that which would be needed to store all of the stream of incoming bits.

In accordance with an embodiment of the invention, an apparatus for performing sequence detection on a stream of incoming bits comprises a memory and circuitry. The circuitry is operative, for each of the incoming bits, to overwrite a first binary number presently stored in the memory with a second binary number, and to provide an output indicative of when the second binary number is equal to a predetermined value. The output indicative of when the second binary number is equal to the predetermined value is, in turn, indicative of when a binary number constructed by the stream of incoming bits is divisible by a predetermined integer.

In accordance with another embodiment of the invention, a method for performing sequence detection on a stream of incoming bits comprises forming a memory and forming circuitry. The circuitry is operative, for each of the incoming bits, to overwrite a first binary number presently stored in the memory with a second binary number, and to provide an output indicative of when the second binary number is equal to a predetermined value. The output indicative of when the second binary number is equal to the predetermined value is, in turn, indicative of when a binary number constructed by the stream of incoming bits is divisible by a predetermined integer.

In accordance with yet another embodiment of the invention, an integrated circuit for performing sequence detection on a stream of incoming bits comprises a memory and circuitry. The circuitry is operative, for each of the incoming bits, to overwrite a first binary number presently stored in the memory with a second binary number, and to provide an output indicative of when the second binary number is equal to a predetermined value. The output indicative of when the second binary number is equal to the predetermined value is, in turn, indicative of when a binary number constructed by the stream of incoming bits is divisible by a predetermined integer.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals, when used, indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

The present invention will be described herein with reference to illustrative embodiments of a sequence detector for beneficially determining whether the number constructed by a stream of incoming bits is divisible by a given integer, among other important features. It is to be understood, however, that the invention is not limited to the embodiments shown and described herein. Rather, the invention is more generally applicable to novel apparatus and methods for efficiently performing sequence detection. Moreover, it will become apparent to those skilled in the art given the teachings herein that numerous modifications can be made to the embodiments shown that are within the scope of the present invention. That is, no limitations with respect to the specific embodiments described herein are intended or should be inferred.

For purposes of this description, the phrase "{x1, x2}," where x1 and x2 are each binary numbers formed by one or more respective bits, shall mean the binary number formed by concatenating x1 with x2. If, for example, x1=10101 and x2=1, then {x1, x2}=101011. Moreover, the acronym "msb"

shall mean "most significant bit," the bit position in a binary number having the greatest value or weight. A binary number modified to be "without the msb" would mean that binary number with its most significant bit dropped. Again, if x1=10101 and x2=1, then ({x1, x2} without the msb)=01011.

Figure 1:
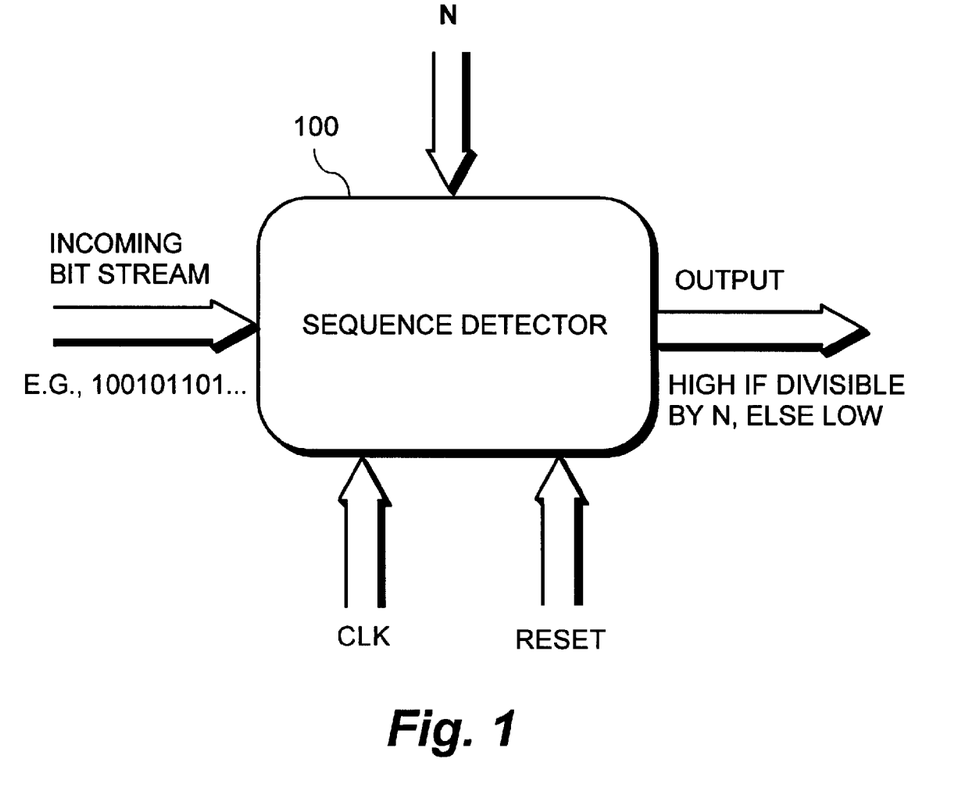
FIG. 1 shows a block diagram of a sequence detector in accordance with an illustrative embodiment of the invention.

FIG. 1 shows a block diagram of a sequence detector 100 in accordance with an illustrative embodiment of the invention. The sequence detector 100 receives several inputs, namely, bits from an incoming bit stream, an integer, N, a clock signal, clk, and a reset signal, reset. The reset signal is used to initiate the start of a sequence detection operation, among other purposes. A function of the sequence detector 100 is to provide an output for each new input bit, d, that indicates whether a binary number constructed by the incoming bit stream received since the last reset is divisible by N. As indicated in the figure, the sequence detector 100 may, for example, output a logical high (i.e., logical "1") if the binary number constructed by the incoming bit stream is presently divisible by N, and output a logical low (i.e., logical "0") if the binary number is not divisible by N. For purposes of this example, it is assumed that a new input bit, d, is received from the incoming bit stream on each clock cycle.

The exemplary sequence detector 100 and, more generally, sequence detectors in accordance with aspects of the invention, may serve several purposes. As just one non-limiting example, a sequence detector incorporating aspects of the invention may be implemented in a communication channel for the purposes of error detection and error correction. When sending binary data from a source, that binary data may be purposefully encoded in such a manner that a block of data will be divisible by a particular integer. Later, at the destination, a sequence detector may determine whether that divisibility property remains intact in the encoded data block. If not, it can be assumed that at least some of the data (e.g., one or more bits) in the data block was corrupted during transmission and that corrective action may be necessary. The destination may request, for example, that a block of data be retransmitted or that an error correction scheme be implemented.

Figure 2:
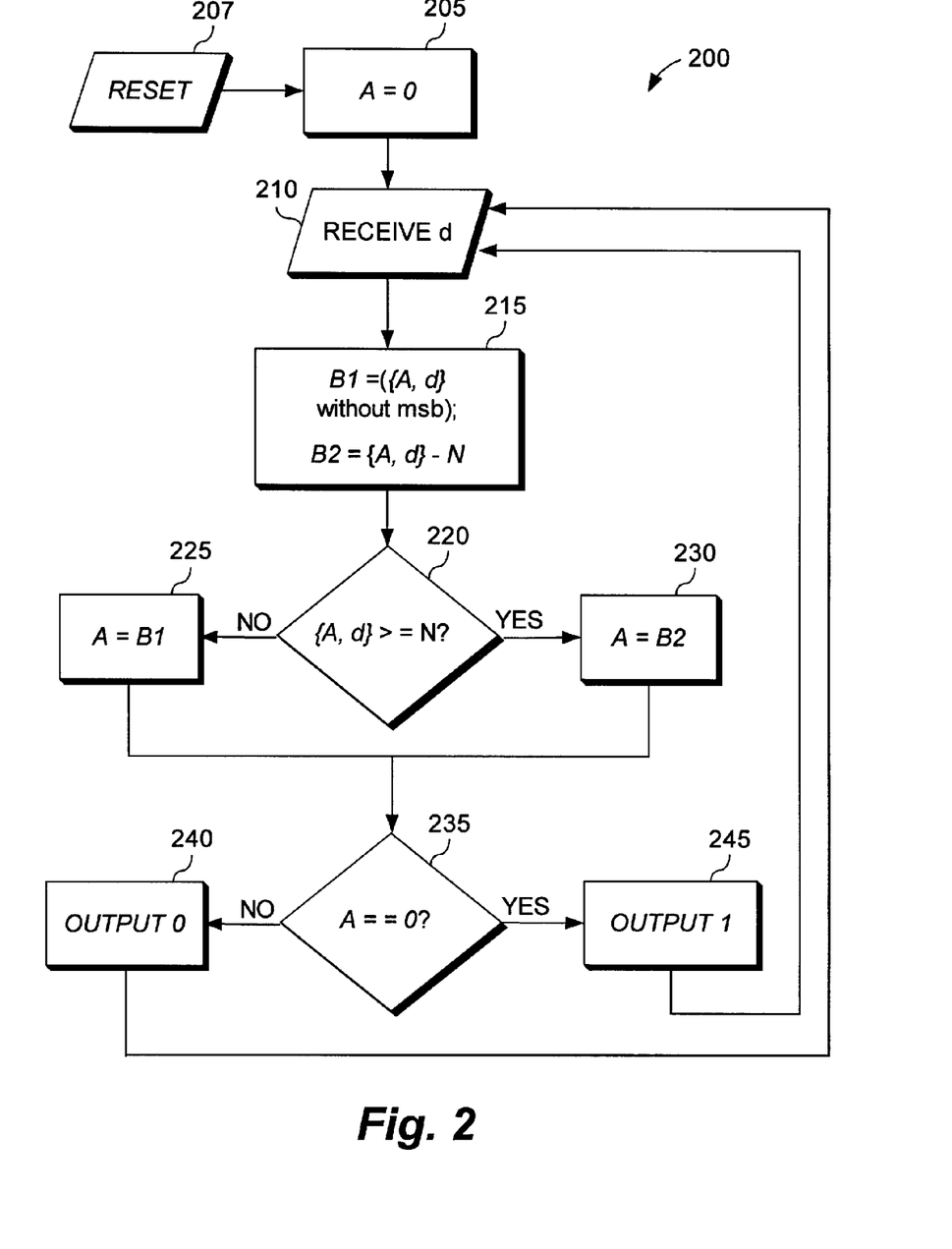
FIG. 2 shows a flow diagram for an illustrative process that may be executed by the FIG. 1 sequence detector to determine divisibility by N, in accordance with an illustrative embodiment of the invention.

FIG. 2 shows a flow diagram for an illustrative process 200 that may be executed by the sequence detector 100 shown in FIG. 1 to determine divisibility by N, in accordance with an embodiment of the invention. In step 205, the sequence detector sets a binary number, A, to zero as part of a reset or initialization step in response to a control signal, which may be a reset input 207. Next, in step 210, a new input bit, d, is received from an incoming bit stream supplied to the sequence detector. In step 215, variables A, d, and N are then transformed into outputs B1 and B2. More particularly, output B1 is preferably set equal to a concatenation of binary number A with input bit d from the incoming bit stream, and then dropping the most significant bit of the result, such that B1=({A, d} without the msb). Similarly, output B2 is preferably set equal to a concatenation of binary number A with input bit d, and then subtracting integer N from the result, such that B2={A, d}−N.

Subsequently, in step 220, the sequence detector 100 (FIG. 1) determines whether {A, d}≥N. If {A, d} is not greater than or equal to N, binary number A is set to B1 in step 225 (i.e., A=B1). Alternatively, if {A, d} is greater than or equal to N, binary number A is set to B2 in step 230 (i.e., A=B2).

Lastly, in step 235, the sequence detector determines whether A is equal to zero (i.e., A==0). If A is not equal to zero, the sequence detector outputs a logical "0" in step 240. Alternatively, if A is equal to zero, the sequence detector outputs a logical "1" in step 245. It is to be appreciated that the assignment of a logic "1" or "0" to the respective outputs generated in steps 240 and 245 is essentially arbitrary. For example, in other embodiments, a logical "1" may be generated in step 240, indicative of A not being equal to zero, and a logical "0" may be generated in step 245, indicative of A being equal to zero. The process 200 is then repeated for a next new input bit, d, in the incoming bit stream by returning to step 210. This cycle may be repeated until a new reset input 207 is received by the sequence detector and the process 200 instead returns to step 205 to begin a new sequence detection operation, or until there are no further bits to evaluate in the incoming bit stream.

Figure 3:
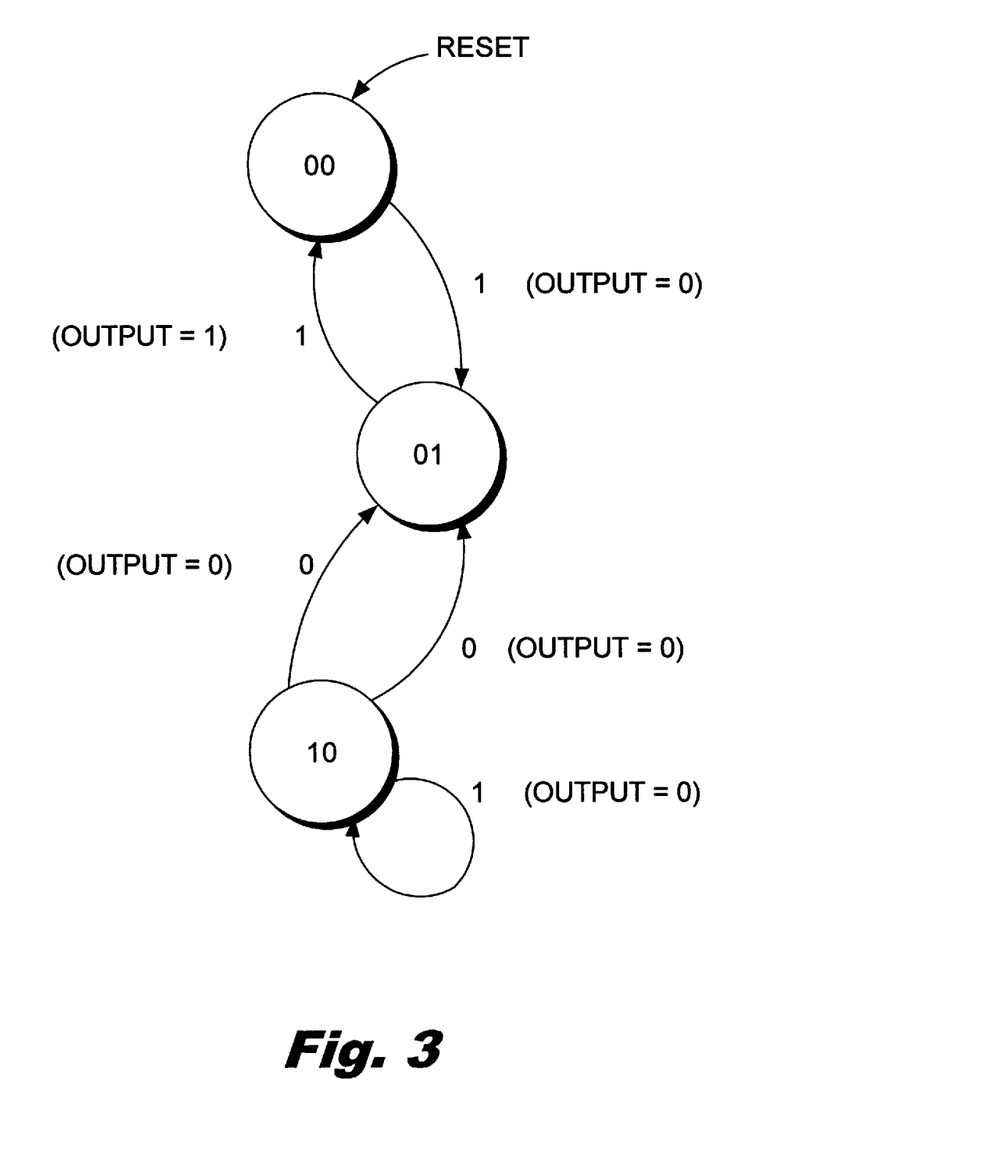
FIG. 3 shows the functioning of the FIG. 2 process by means of a finite state machine representation for a particular exemplary value of N and a particular exemplary incoming bit stream, according to an embodiment of the invention.

In accordance with one of the above-described purposes for the sequence detector 100 shown in FIG. 1, the respective outputs generated at steps 240 and 245 indicate whether the binary number constructed by the incoming bit stream since receiving the last reset is divisible by N. In order to illustrate the capabilities of the process 200, FIG. 3 shows the functioning of the process 200 by means of a finite state machine representation for a particular exemplary value of N and a particular exemplary incoming bit stream, according to an embodiment of the invention. For purposes of this figure, each of the binary numbers A are set forth as respective states (e.g., 00, 01 and 10), while each of the incoming bits d are set forth as respective transition conditions between states. In this particular example, and without limitation, N=3 and the incoming bit stream is 101011. As revealed by the figure, the state machine continues to output logical "0's" until the number formed by the incoming bit stream equals 10101=21 at the fifth transition. Here, the state machine properly outputs a logical "1" because the number 21 is indeed divisible by three.

Figure 4:
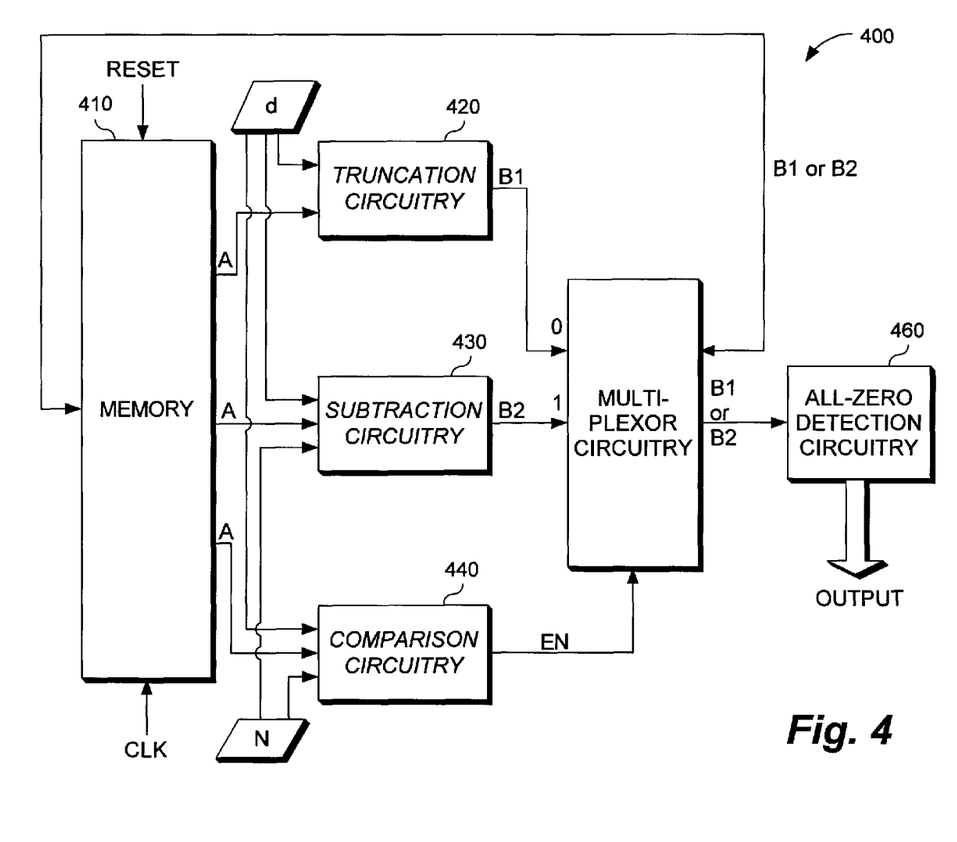
FIG. 4 shows a block diagram of at least a portion of illustrative circuitry that may be used in implementing the FIG. 2 process in the FIG. 1 sequence detector, in accordance with an embodiment of the invention.

FIG. 4 shows a block diagram of at least a portion of illustrative circuitry 400 that may be used in implementing the process 200 in the sequence detector 100, in accordance with an embodiment of the invention. The circuitry 400 includes a memory 410, truncation circuitry 420, subtraction circuitry 430, comparison circuitry 440, multiplexor circuitry 450, and all-zero detection circuitry 460. Each of these blocks 410-460 is operative to perform one or more steps within the process 200 shown in FIG. 2. Nevertheless, it should be noted that the several blocks 410-460 called out in FIG. 4 are not intended to represent the physical configuration of these circuit elements, but are, instead, intended to merely highlight some of their functionally distinct aspects. For purposes of efficiency or based on other considerations, it may, for example, be beneficial to implement two or more of the blocks 410-460 with shared physical elements. Once the novel functionality of these blocks 410-460 is understood given the teachings herein, they can be implemented by a person having ordinary skill in the circuit design arts using analog circuits, digital circuits, or a combination thereof. Information pertaining to circuit design is also presented in a number of readily available references, including, as just an example, P. Horowitz et al., *The Art of Electronics, Second Edition*, Cambridge University Press, 1989, which is hereby incorporated by reference herein.

In the illustrative embodiment, the memory 410 is, for example, utilized to store the binary number A in the process 200 in accordance with steps 205, 225, and 230 (see FIG. 2). The memory 410 may, therefore, comprise any memory element sufficient to store the binary number A and to allow A to be output to the truncation circuitry 420, the subtraction circuitry 430, and the comparison circuitry 440. In a preferred embodiment of the invention, the memory 410 may, for example, comprise a shift-type register operative to store bits of data in a series of linked flip-flops. Advantageously, the sequence detector 100 (see FIG. 1) is operative to function with the memory 410 having a storage capacity substantially smaller than that needed to store the entire incoming bit stream. Rather than being dictated by the incoming bit stream, the minimum storage capacity of the memory 410 is, instead, dictated by the value of N, or some other parameter. In accordance with aspects of the invention, the sequence detector 100 may function properly, for example, with the memory 410 being capable of storing n bits, where n≥log$_2$N. In the example shown in FIG. 3 by way of the finite state machine representation, for instance, only two bits of data were needed to store A at any one time for N=3 (i.e., minimum n=2 for N=3). Were the value of N set equal to five, as just another example, the memory 410 would only need to have the capacity to store three bits of data at any one time (i.e., minimum n=3 for N=5). The memory capacity needed to implement aspects of the invention is thereby quite small.

After receiving binary number A from the memory 410, the truncation circuitry 420 and the subtraction circuitry 430 preferably utilizes d and N to transform A into outputs B1 and B2, respectively, in accordance with the calculations provided in step 215 of the process 200. The truncation circuitry 420, is, for example, operative to receive A from the memory 410 and utilize d to transform A into an output B1, where B1=({A, d} without the msb). In a similar manner, the subtraction circuitry 430 is operative to receive A from the memory 410 and utilize d and N to transform A into B2, where B2={A, d}−N.

The outputs B1 and B2 is next routed to the multiplexor circuitry 450, wherein one of the binary numbers is selected, as a function of a control signal, en, supplied to the multiplexor circuitry, and passed on for further processing in accordance with step 220 of the process 200. In the illustrative embodiment shown in FIG. 4, the comparison circuitry 440 is operative to generate the control signal en supplied to the multiplexor circuitry 450.

Having received A, d, and N, the comparison circuitry 440 is preferably operative to compare the concatenation of binary number A and input bit d (i.e., {A, d}) with prescribed integer N to determine whether or not {A, d}≥N. If the comparison is false (i.e., {A, d} is not greater than or equal to N), the control signal en generated by the comparison circuitry 440 directs the multiplexor circuitry 450 to select output B1 as the output thereof. If, instead, the comparison is true (i.e., {A, d} is greater than or equal to N), the control signal en generated by the comparison circuitry 440 directs the multiplexor circuitry 450 to select output B2 as the output thereof. Depending on the selected output, B1 or B2 is sent to the memory 410 and the binary number presently in the memory, A, is overwritten with the value of B1 or B2, in accordance with steps 225 and 230 of the process 200.

Finally, the output of the multiplexor circuitry 450 (i.e., B1 or B2) is sent to the all-zero detection circuitry 460, which determines whether that output is equal to zero in accordance with step 235 of the process 200. If true, the all-zero detection circuitry 460 outputs a logical "1" indicating that the binary number constructed by the incoming bit stream is, indeed, divisible by N. Otherwise, the all-zero detection circuitry 460 outputs a logical "0," indicating that this binary number is not divisible by N. It is to be appreciated that the invention is not limited to this specific assignment of logical "1" and logical "0" to the output of all-zero detection circuitry 460.

To verify the functionality of the sequence detector 100, a sequence detector like the sequence detector 100 was modeled for N=5. The model was conducted using VERILOG® from Cadence Design Systems, Inc. (San Jose, Calif., USA). VERILOG is a hardware description language commonly used to model electronic systems such as digital logic chips. The VERILOG programming language will be familiar to one skilled in the electronics arts and is also described in a number of readily available publications, including, for example, V. Sagdeo, *The Complete Verilog Book*, Springer, 1998, which is hereby incorporated by reference herein.

Figure 5:
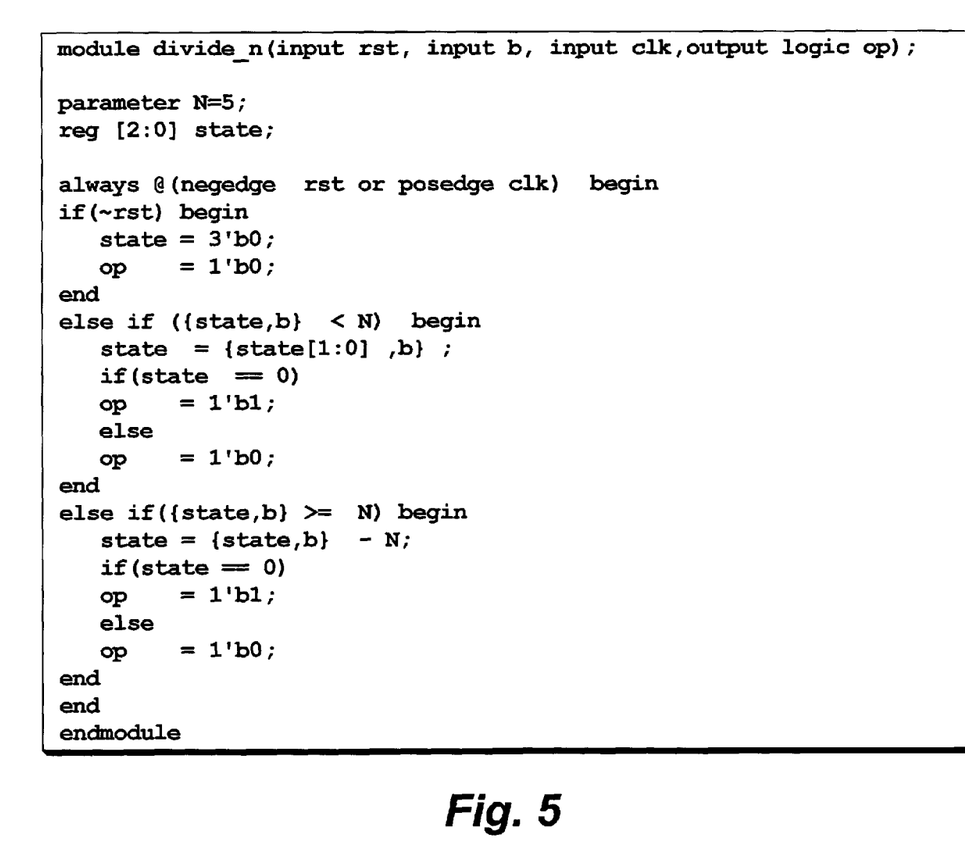
FIG. 5 shows illustrative programming code for modeling the FIG. 1 sequence detector, according to an embodiment of the invention.
Figure 6:
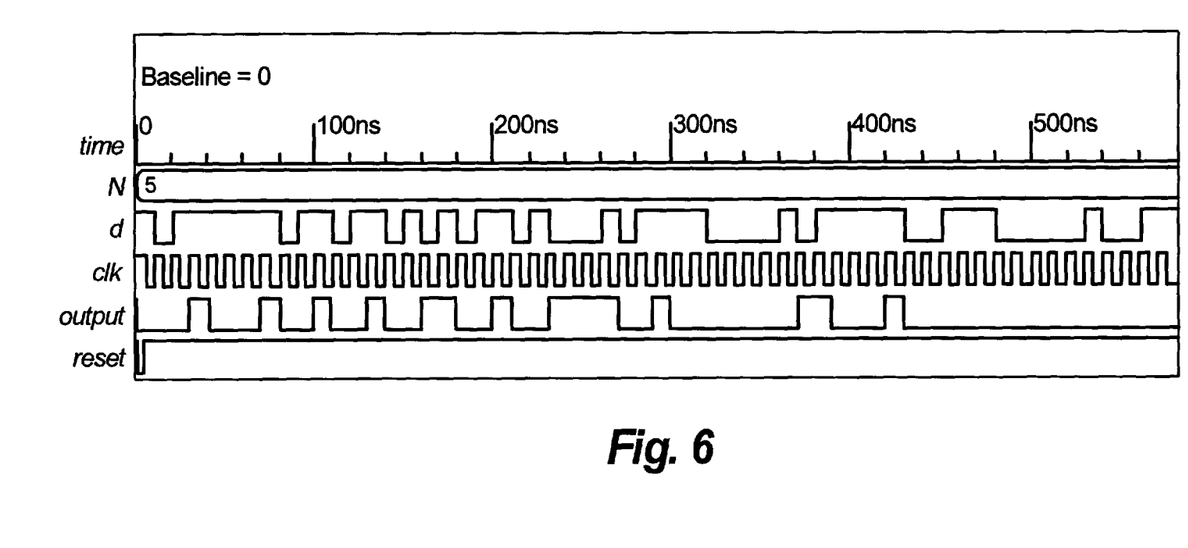
FIG. 6 shows illustrative timing waveforms for the FIG. 1 sequence detector operative in accordance with techniques of the invention.

FIG. 5 shows illustrative programming code for modeling the FIG. 1 sequence detector, according to an embodiment of the invention. It is to be understood, however, that the invention is not limited to this or any specific programming code. For purposes of the modeling, a random number generator was utilized to form an incoming bit stream. FIG. 6, in turn, shows illustrative results generated by the model. More particularly, FIG. 6 shows N, d, clk, output, and reset signals as a function of time, where output is the output of the modeled sequence detector indicating divisibility by the prescribed number N (e.g., N=5, in this illustrative embodiment). It will be noted that the output is a logical "1" at timestamps 30, 70, 100, 130, 160, and 170 nanoseconds (ns), meaning that the binary numbers received from the randomly generated incoming bit stream up to those particular points in time were divisible by five. This is indeed appropriate, since these timestamps correspond to the received numbers of 5, 95, 765, 6125, and 98010, respectively, each clearly divisible by five.

At least a portion of the techniques of the present invention may be implemented in one or more integrated circuits. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Several elements shown in FIG. 4 may, for example, be part of one or more integrated circuits utilizing conventional integrated circuit design and fabrication techniques. These techniques, in addition to being conventional, are also described in several readily available references, including, for example, N. H. E. Weste et al., *Integrated Circuit Design*, Pearson, 2010, which is also hereby incorporated by reference herein. Integrated circuits so manufactured, as well as systems incorporating such integrated circuits, are considered part of this invention.

What is more, although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. Other embodiments may use, for example, different process steps and/or forms, types, and arrangements of elements for implementing the described functionality. An apparatus or method within the scope of the invention may, therefore, appear very different from the illustrative embodiments expressly described herein. These numerous alternative embodiments within the scope of the appended claims will become apparent to one skilled in the art given the teachings herein. Moreover, all or a portion of the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for performing sequence detection on a stream of incoming bits, the apparatus comprising:
   a memory; and
   circuitry coupled with the memory and operative, for each bit, d, of the stream of incoming bits, to overwrite a first binary number, A, presently stored in the memory with a second binary number, B, and to provide an output indicative of when B is equal to a predetermined value;

wherein the output indicative of when B is equal to the predetermined value is indicative of when a binary number constructed by the stream of incoming bits is divisible by a prescribed integer, N.

2. The apparatus of claim 1, wherein the second binary number B is set equal to one of (i) a concatenation of the first binary number A with an input bit d from the stream of incoming bits, and then dropping a most significant bit of a result of the concatenation, and (ii) a concatenation of the first binary number A with an input bit d from the stream of incoming bits, and then subtracting the prescribed integer N from a result of the concatenation, as a function of whether the result of the concatenation is greater than or equal to the prescribed integer N.

3. The apparatus of claim 2, wherein the second binary number B is set equal to the concatenation of the first binary number A with an input bit d from the stream of incoming bits, and then dropping the most significant bit of the result of the concatenation when the result of the concatenation is less than the prescribed integer N, and the second binary number B is set equal to the concatenation of the first binary number with the input bit d, and then subtracting the prescribed integer N when the result of the concatenation is greater than or equal to the prescribed integer N.

4. The apparatus of claim 1, wherein the predetermined value is zero.

5. The apparatus of claim 1, wherein the memory comprises a register.

6. The apparatus of claim 5, wherein the register comprises a shift register.

7. The apparatus of claim 1, wherein the memory has a storage capacity substantially smaller than that needed to store all of the stream of incoming bits.

8. The apparatus of claim 1, wherein the memory is operative to store n bits, with n being greater than or equal to $\log_2 N$.

9. The apparatus of claim 1, wherein the circuitry comprises:
   first circuitry operative to provide a first output equal to a concatenation of the first binary number A with an input bit d from the stream of incoming bits, and then dropping a most significant bit of a result of the concatenation;
   second circuitry operative to provide a second output equal to a concatenation of the first binary number A with an input bit d from the stream of incoming bits, and then subtracting the prescribed integer N from a result of the concatenation;
   third circuitry operative to provide a third output indicative of when the result of the concatenation of the first binary number A with the input bit d is greater than or equal to the prescribed integer N; and
   fourth circuitry operative to provide a fourth output equal to the first output or the second output as a function of the third output.

10. The apparatus of claim 9, wherein the third circuitry comprises a comparator.

11. The apparatus of claim 9, wherein the fourth circuitry comprises a multiplexor.

12. The apparatus of claim 9, wherein the circuitry further comprises fifth circuitry operative to provide a fifth output indicative of when the fourth output is equal to zero.

13. The apparatus of claim 1, wherein the apparatus is operative to receive a reset signal that, upon assertion of the reset signal, causes the apparatus to determine when a binary number constructed by the stream of incoming bits received since assertion of the reset signal is divisible by the prescribed integer N.

14. A method for performing sequence detection on a stream of incoming bits, the method comprising the steps of:
   providing a memory; and
   providing circuitry operative, for each bit, d, of the stream of incoming bits, to overwrite a first binary number, A, presently stored in the memory with a second binary number, B, and to provide an output indicative of when B is equal to a predetermined value;
   wherein the output indicative of when B is equal to the predetermined value is indicative of when a binary number constructed by the stream of incoming bits is divisible by a prescribed integer, N.

15. The method of claim 14, further comprising setting the second binary number B equal to one of (i) a concatenation of the first binary number A with a given input bit d from the stream of incoming bits, and then dropping a most significant bit of a result of the concatenation, and (ii) a concatenation of the first binary number A with an input bit d from the stream of incoming bits, and then subtracting the prescribed integer N from a result of the concatenation, as a function of whether the result of the concatenation is greater than or equal to the prescribed integer N.

16. The method of claim 14, further comprising:
   providing a first output equal to a concatenation of the first binary number A with a given input bit d from the stream of incoming bits, and then dropping a most significant bit of a result of the concatenation;
   providing a second output equal to a concatenation of the first binary number A with an input bit d from the stream of incoming bits, and then subtracting the prescribed integer N from a result of the concatenation;
   providing a third output indicative of when the result of the concatenation is greater than or equal to the prescribed integer N; and
   providing a fourth output equal to the first output or equal to the second output as a function of the third output.

17. An integrated circuit operative to perform sequence detection on a stream of incoming bits, the integrated circuit comprising:
   a memory; and
   circuitry coupled with the memory and operative, for each bit, d, of the stream of incoming bits, to overwrite a first binary number, A, presently stored in the memory with a second binary number, B, and to provide an output indicative of when B is equal to a predetermined value;
   wherein the output indicative of when B is equal to the predetermined value is indicative of when a binary number constructed by the stream of incoming bits is divisible by a prescribed integer, N.

18. The integrated circuit of claim 17, wherein the second binary number B is set equal to one of (i) a concatenation of the first binary number A with an input bit d from the stream of incoming bits, and then dropping a most significant bit of a result of the concatenation, and (ii) a concatenation of the first binary number A with an input bit d from the stream of incoming bits, and then subtracting the prescribed integer N from a result of the concatenation, as a function of whether the result of the concatenation is greater than or equal to the prescribed integer N.

19. The integrated circuit of claim 17, wherein the memory has a storage capacity substantially smaller than that needed to store all of the stream of incoming bits.

20. The integrated circuit of claim 17, wherein the circuitry comprises:

first circuitry operative to provide a first output equal to a concatenation of the first binary number A with an input bit d from the stream of incoming bits, and then dropping a most significant bit of a result of the concatenation;

second circuitry operative to provide a second output equal to a concatenation of the first binary number A with an input bit d from the stream of incoming bits, and then subtracting the prescribed integer N from a result of the concatenation;

third circuitry operative to provide a third output indicative of when the result of the concatenation of the first binary number A with the input bit d is greater than or equal to the prescribed integer N; and fourth circuitry operative to provide a fourth output equal to the first output or the second output as a function of the third output.

* * * * *